United States Patent [19]
Kim et al.

[11] Patent Number: 5,912,815
[45] Date of Patent: Jun. 15, 1999

[54] LOCAL RELAXATION METHOD FOR ESTIMATING OPTICAL FLOW

[75] Inventors: Jong-dae Kim, Kwacheon, Rep. of Korea; Sanjit K. Mitra, Santa Barbara, Calif.; Kye-ho Park, Suwon; Dong-seek Park, Daegu, both of Rep. of Korea

[73] Assignees: The Regents of the University of California, Oakland, Calif.; Samsung Electronics Co., Ltd., Kyungki-Do, Rep. of Korea

[21] Appl. No.: 08/818,982

[22] Filed: Mar. 14, 1997

[51] Int. Cl.$^6$ ............................................. G06F 17/10
[52] U.S. Cl. ........................ 364/153; 364/152; 382/236
[58] Field of Search ................................. 364/525, 516, 364/735, 152, 153; 340/903; 382/236, 248

[56] References Cited

U.S. PATENT DOCUMENTS

| | | | |
|---|---|---|---|
| 5,119,323 | 6/1992 | Nickerson et al. | 364/735 |
| 5,257,209 | 10/1993 | Markandey | 364/516 |
| 5,631,639 | 5/1997 | Hibino et al. | 340/903 |

FOREIGN PATENT DOCUMENTS 552749  7/1993  European Pat. Off. .

*Primary Examiner*—James P. Trammell
*Assistant Examiner*—Matthew Smithers
*Attorney, Agent, or Firm*—Sughrue, Mion, Zinn, Macpeak & Seas, PLLC

[57] ABSTRACT

A local relaxation method for estimating optical flow using a Poisson equation is provided. The local relaxation method includes the steps of a) determining the Poisson equation in a linear matrix of $Gx=Ex+b$ according to a change of time, b) decoupling the determined velocity combination term of the Poisson equation, and c) applying a displaced frame difference of a temporal change to the Poisson equation where the velocity combination term is decoupled. Accordingly, the convergence speed is faster than that obtained using conventional technology. Also, in the case that a displaced frame difference is applied, the convergence value is accurate and motion in every pixel can be estimated in order to enhance image quality, and in the case of a video code, compression gain can be obtained by using a portion of a motion vector, i.e., the motion vector of a low band signal.

7 Claims, 14 Drawing Sheets

LOCAL RELAXATION METHOD FOR ESTIMATING OPTICAL FLOW

BACKGROUND OF THE INVENTION

The present invention relates to a local relaxation (LR) method for optical flow estimation, and, more particularly, to an LR method for optical flow estimation through a velocity combination term using the Poisson equation (decoupling).

Recently, application of the local relaxation (LR) method for optical flow estimation has shown a much better performance than the Gauss-Seidel relaxation method. However, the direct application of the LR method results in relatively slow convergence, because the Poisson equations in which an optical flow estimation problem is framed are coupled.

Local relaxation (LR) algorithms perform well for estimating optical flow, which is the apparent velocity field of the brightness patterns in successive image frames. An LR algorithm can be applied even with the new regularization method, using a multiscale approach which is not sensitive to the regularization parameter. The LR algorithm is a kind of successive over-relaxation scheme (SOR) with spatially varying relaxation parameters, which outperforms Gauss-Seidel relaxation (GS) when used for optical flow estimation. However, a direct application of the LR algorithm for optical flow estimation may degrade performance. This is because two velocity components of the optical flow field are intrinsically coupled to give a set of coupled Poisson equations. Decoupling of these Poisson equations will make it clear how each decoupled component of velocity can be represented in terms of Jacobi relaxation to help select a better local relaxation factor.

The LR algorithm can be applied to the optical flow if this problem is formulated as a boundary value problem. This formulation starts from the brightness constraint equation which comes from the assumption that local brightness patterns are not changed during the time interval of successive image frames, as shown in the following formula (1);

$$I(x+\delta x, y+\delta y, t+\delta t) = I(x, y, t) \tag{1}$$

which means that an intensive pattern around an image point (x, y) is moved by the amount of ($\delta x$, $\delta y$) over a time interval $\delta t$ without changing its pattern. Expanding the right hand side of formula (1) and ignoring higher order terms, the following formula (2) can be obtained.

$$I(x+\delta x, y+\delta y, t+\delta t) = I(x, y, t) + \delta x\, I_x + \delta x\, I_y + \delta x\, I_t \tag{2}$$

where $l_x$, $l_y$ and $l_t$ respectively represent horizontal, vertical and temporal gradients of an intensity pattern at position (x, y) at time t.

Combining formulas (1) and (2), and dividing by $\delta t$, the following linear relation between gradients and velocity is introduced.

$$l_x u + l_y v + l_t = 0 \tag{3}$$

where u and v are horizontal velocity $$\frac{\partial x}{\partial t}$$

and vertical velocity $$\frac{\partial y}{\partial t},$$

respectively.

The linear formula (3) is used to measure a local velocity vector. The set of this brightness constraint equation is, however, highly ill-posed for usual image sequences because of the well-known aperture problem. To overcome this short-coming, Horn and Schunck introduced a smoothness constraint which results in the following optimization equation (4);

$$\int\int (I_x u + I_y v + I_t)^2 + \alpha^2 \left\{ \left(\frac{\partial u}{\partial x}\right)^2 + \left(\frac{\partial u}{\partial y}\right)^2 + \left(\frac{\partial v}{\partial x}\right)^2 + \left(\frac{\partial v}{\partial y}\right)^2 \right\} dx\,dy \tag{4}$$

The second term of the above equation (4) penalizes the deviation from the smoothness of velocity field and the constant $\alpha^2$ is for a compromise between both constraints.

The following coupled Poisson equations result directly from the optimization equation (4);

$$\nabla^2 u = \frac{1}{\alpha^2} I_x (I_x u + I_y v + I_t) \tag{5}$$

$$\nabla^2 v = \frac{1}{\alpha^2} I_y (I_x u + I_y v + I_t)$$

where $\alpha$ indicates a constant. Each of the coupled Poisson equations can be solved using the iterative methods for inverse problems of a large linear system such as Jacobi relaxation (JR), Gauss-Seidel relaxation (GS), Successive-over relaxation (SOR). Since the equations (5) have spatially varying coefficients due to spatial gradients in the right-hand terms thereof, it is difficult to determine the optimal relaxation parameter in SOR. In this case, LR can be applied to solve the equations iteratively.

The equations (5) might be decoupled using a unitary transform before applying LR to obtain better performance, given the fact that one of the resultant equations has constant relaxation coefficients. This method might show a similar performance to that without decoupling, because the coupling terms of equations (5) are very small when the optimal smoothness constant $\alpha$ is very large. The constant $\alpha$ is usually large since, the deviation of the true motion field from the motion constraint is larger than that from the smoothness constraint. But, if the displace frame difference is used to reduce the motion constraint error, the desired optimal smoothness constraint will be so small that the effect of decoupling cannot be negligible.

A local relaxation method will be described as follows. Horizontal (vertical) forward-shift and backward-shift operators, $E_x$ and $E_x^{-1}$ ($E_y$ and $E_y^{-1}$) are defined as:

$$E_x u(x,y) = u(x+h, y)\ \ E_x^{-1} u(x,y) = u(x-h, y) \tag{6}$$

$$E_y u(x,y) = u(x, y+h)\ \ E_y^{-1} u(x,y) = u(x, y-h),$$

where h is the discrimination distance.

And, the superposed shift operator E is defined as;

$$E = \tfrac{1}{4}(E_x + E_x^{-1} + E_y + E_y^{-1}) \tag{7}$$

The gradients normalized by the smoothness constant to simplify the equations are represented as;

$$r_x = \frac{I_x}{a}, \quad r_y = \frac{I_y}{a}, \quad r_t = \frac{I_t}{a} \qquad (8)$$

Then, using the composite shift operator E and the normalized gradients, equations (5) can be represented as;

$$Eu = (1+r_x^2)u + r_x r_y v + r_x r_t$$
$$Ev = r_y r_x u + (1+r_y^2)v + r_y r_t \qquad (9)$$

If the coupling term in each equation, for example, $r_x r_y v$ in the equation for the "u" field, is ignored, the following Jacobi relaxation can be obtained to solve equation (9).

$$u^{n+1} = \frac{1}{1+r_x^2}(Eu^n - r_x r_y v^n - r_x r_t) \qquad (10)$$

$$v^{n+1} = \frac{1}{1+r_y^2}(Ev^n - r_y r_x u^{n+1} - r_y r_t)$$

In this case, the Jacobi operator of each component, i.e., $J_u$ and $J_v$, can be expressed as follows;

$$J_u = \frac{1}{1+r_x^2}E, \quad J_v = \frac{1}{1+r_y^2}E \qquad (11)$$

and their local spectral radii are, $$\rho_u = \frac{1}{1+r_x^2}\rho_E, \quad \rho_v = \frac{1}{1+r_y^2}\rho_E \qquad (12)$$

where if the image size is M×N, $P_E$ is, $$\rho_E = \frac{1}{2}\left(\cos\frac{\pi}{M+1} + \cos\frac{\pi}{N+1}\right) \qquad (13)$$

Here, the horizontal motion field "u" will converge faster than the vertical motion field when horizontal gradients are larger than vertical gradients and vice versa. As the spectral radius of the Jacobi operator varies spatially according to spatial gradients, LR can be used to obtain the following equation (14), $$u^{n+1} = (1-w_u)u^n + \frac{w_u}{1+r_x^2}(Eu^n - r_x r_y v^n - r_x r_t) \qquad (14)$$

$$v^{n+1} = (1-w_v)v^n + \frac{w_v}{1+r_y^2}(Ev^n - r_y r_x u^{n+1} - r_y r_t)$$

where the local relaxation parameters are given by $$w_u = \frac{2}{1+\sqrt{1-\rho_u^2}}, \quad w_v = \frac{2}{1+\sqrt{1-\rho_v^2}} \qquad (15)$$

As described above, the direct application of LR to equation (9) degrades the convergence speed because equation (9) is coupled.

SUMMARY OF THE INVENTION

It is therefore an object of the present invention to provide a local relaxation method whereby a Poisson equation is decoupled and then the decoupled value is applied to local relaxation to obtain rapid convergence speed and to estimate optical flow.

To accomplish the above object of the present invention, there is provided a local relaxation method for estimating optical flow using a Poisson equation comprising the steps of: a) determining the Poisson equation according to a change of time by a linear matrix of Gx=Ex+b; b) decoupling the determined velocity combination term of the Poisson equation; and c) applying a displaced frame difference of a temporal change to the Poisson equation where the velocity combination expression is decoupled.

It is preferable that a unitary transform function be used in the step b).

In further accordance with the above objects of the present invention, there is provided an apparatus for coding video data, including: input means for receiving two or more frames of video data representative of image sequences; and an optical flow estimation circuitry, coupled to the input means and being operative to estimate optical flow within the frames of video data using a Poisson equation, the optical flow estimation circuitry comprising: means for determining the Poisson equation in a linear matrix of Gx=Ex+b according to a change of time; means for decoupling a determined velocity combination term of the Poisson equation; and means for applying a displaced frame difference of a temporal change to the Poisson equation where the velocity combination term is decoupled.

In further accordance with the above objects of the present invention, there is provided a collision alarm system including: input means for receiving two or more frames of video data representative of image sequences; an optical flow estimation circuitry, coupled to the input means and being operative to estimate optical flow within the frames of video data using a Poisson equation, the optical flow estimation circuitry comprising: means for determining the Poisson equation in a linear matrix of Gx=Ex+b according to a change of time; means for decoupling a determined velocity combination term of the Poisson equation; and means for applying a displaced frame difference of a temporal change to the Poisson equation where the velocity combination term is decoupled; a structure analysis circuitry, coupled to an output of the optical flow estimation circuitry, for extracting structure of one or more moving objects within the image sequences; a motion analysis circuitry, coupled to the output of the optical flow estimation circuitry, for determining relative movement of the objects within the image sequences; and inference circuitry, coupled to an output of the structure analysis circuitry and the motion analysis circuitry, for determining if a collision between at least two objects is about to occur and outputting a collision alarm signal accordingly.

BRIEF DESCRIPTION OF THE DRAWINGS

The above objects and advantages of the present invention will become more apparent by describing in detail a preferred embodiment thereof with reference to the attached drawings in which:

FIG. 3b shows a motion field corresponding to the "Sinewave" of FIG. 3a;

DETAILED DESCRIPTION OF THE INVENTION

The present invention which is directed to a local relaxation method for estimating optical flow is applicable in, for example, the coding of video data for many video-dependent applications such as a DPCM coder or collision alarm system. The estimation of optical flow is critical for efficiently processing large amounts of data and providing high computational power when many iterative steps are required. The fast convergent algorithm, as that disclosed herein, is suitable for such applications.

Figure 13:
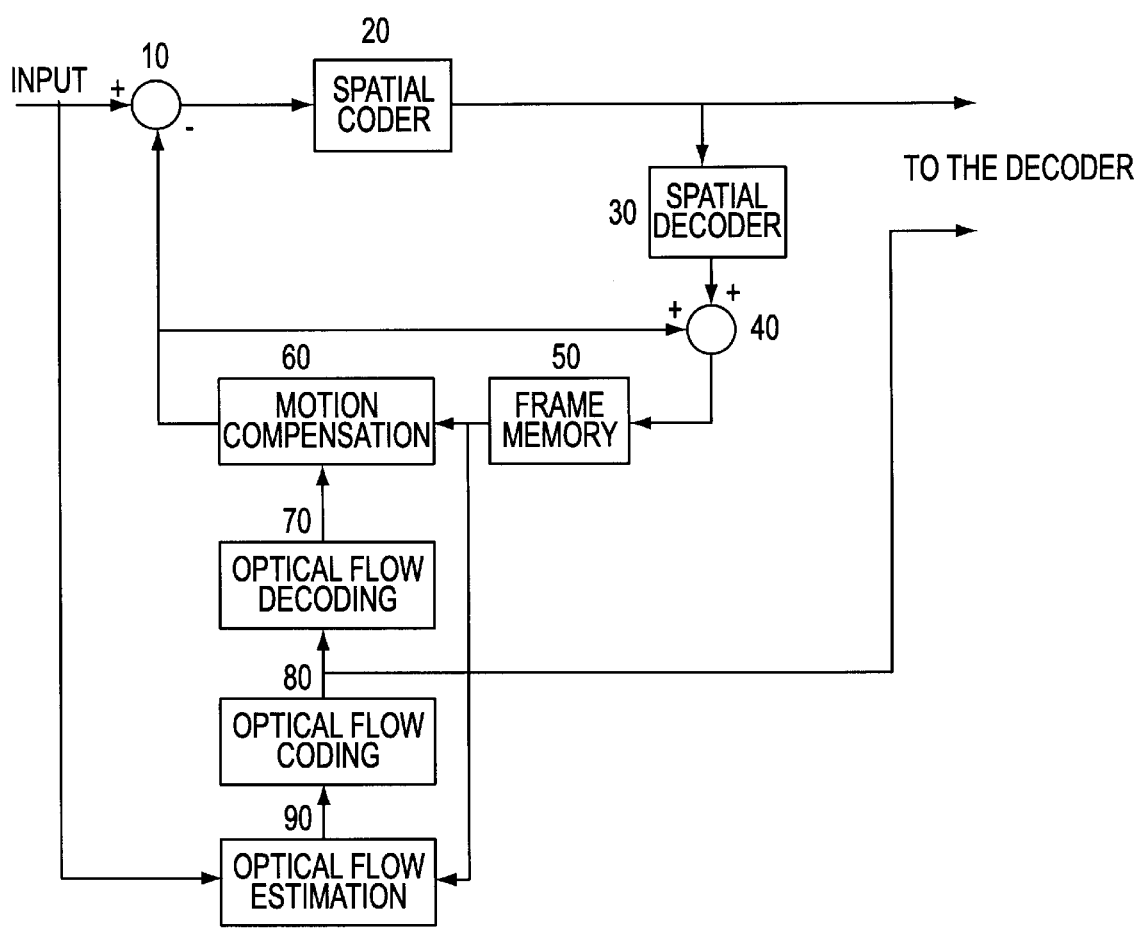
FIG. 13 illustrates a DPCM coder which includes an optical flow estimation circuitry for estimating optical flow in accordance to the present invention.

For example, FIG. 13 illustrates a basic DPCM coder, which is utilized in the optical flow estimation of video coding. The coder receives an input such as a current frame of an image sequence that is to be coded. The input is applied to a subtractor 10, whose output is coupled to an input of a spatial coder 20. The output of the spatial coder 20 is applied to a video decoder (not shown) and also to an input of a spatial decoder 30. The input is also input to an optical flow estimation circuitry 90 which is constructed and designed to operate in accordance with the present invention as described more fully below.

The output of the optical flow estimation circuitry 90 is applied to an optical flow coder 80, whose output is applied to the video decoder (not shown) and to an optical flow decoder 70. The output of the optical flow decoder 70 is coupled to a motion compensation circuitry 60. The output of the motion compensation circuitry 60 is subtracted from the input via the subtractor 10, and added to the output of the spatial decoder 30 by the accumulator 40. The output of the accumulator 40 is applied to a frame memory 50, whose output is coupled to inputs of both the motion compensation circuitry 60 and optical flow estimation circuitry 90.

With further reference to FIG. 13, the current frame is predicted by previous reconstructed frames which can be warped by any motion information such as block motion algorithms (BMA) or optical flow. The motion compensation circuitry 60 warps the previous reconstructed frame in the frame memory 50 to predict the current frame. The predicted frame is subtracted from the input current frame in the subtractor 10, which yields a prediction error signal, which usually has less entropy than the original input frame. The prediction error signal is further compressed by the spatial coder 20, which implements any one of several algorithms well known in the art. For example, the spatial coder 20 may implement a compression algorithm based on a transform code such as a discrete cosine transform (DCT) or wavelet transform (WT). The coded error signal is decoded and then added to a previous warped frame in the accumulator 40 to reconstruct the current frame.

Figure 14:
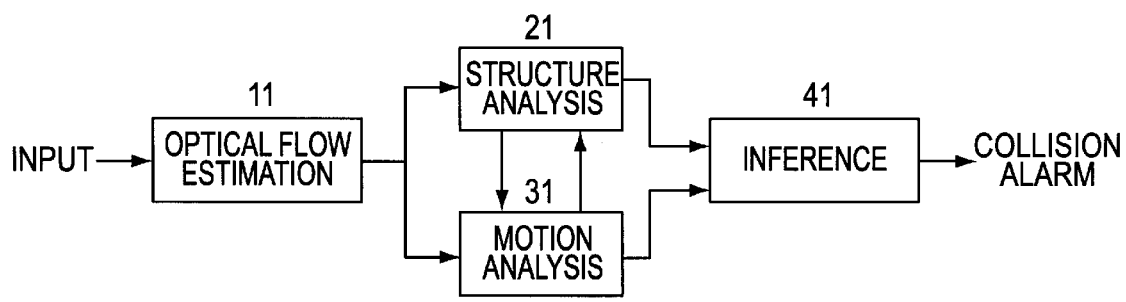
FIG. 14 illustrates a collision alarm system which includes an optical flow estimation circuitry for estimating optical flow in accordance with the present invention.

FIG. 14 illustrates yet another practical application to which the present invention is directed. Specifically, FIG. 14 illustrates a collision alarm system in which optical flow is estimated in a collision detection system for an automated vehicle. A video data sequence is input to an optical flow estimator 11. The estimated optical flow is applied to a structure analysis circuitry 21 and utilized for extracting the structure of moving objects (e.g., vehicles). The motion behavior of each object is analyzed in a motion analysis circuitry 31, which is coupled to the output of the optical flow estimation circuitry 11 and structure analysis circuitry 21. During the analysis phase of the structures of objects within a given scene and their respective movement, both the structure analysis circuitry 21 and motion analysis circuitry 31 communicate with each other. The analyzed information is output to a collision alarm signal with the inference circuitry 41, which outputs a collision alarm signal.

Figure 1:
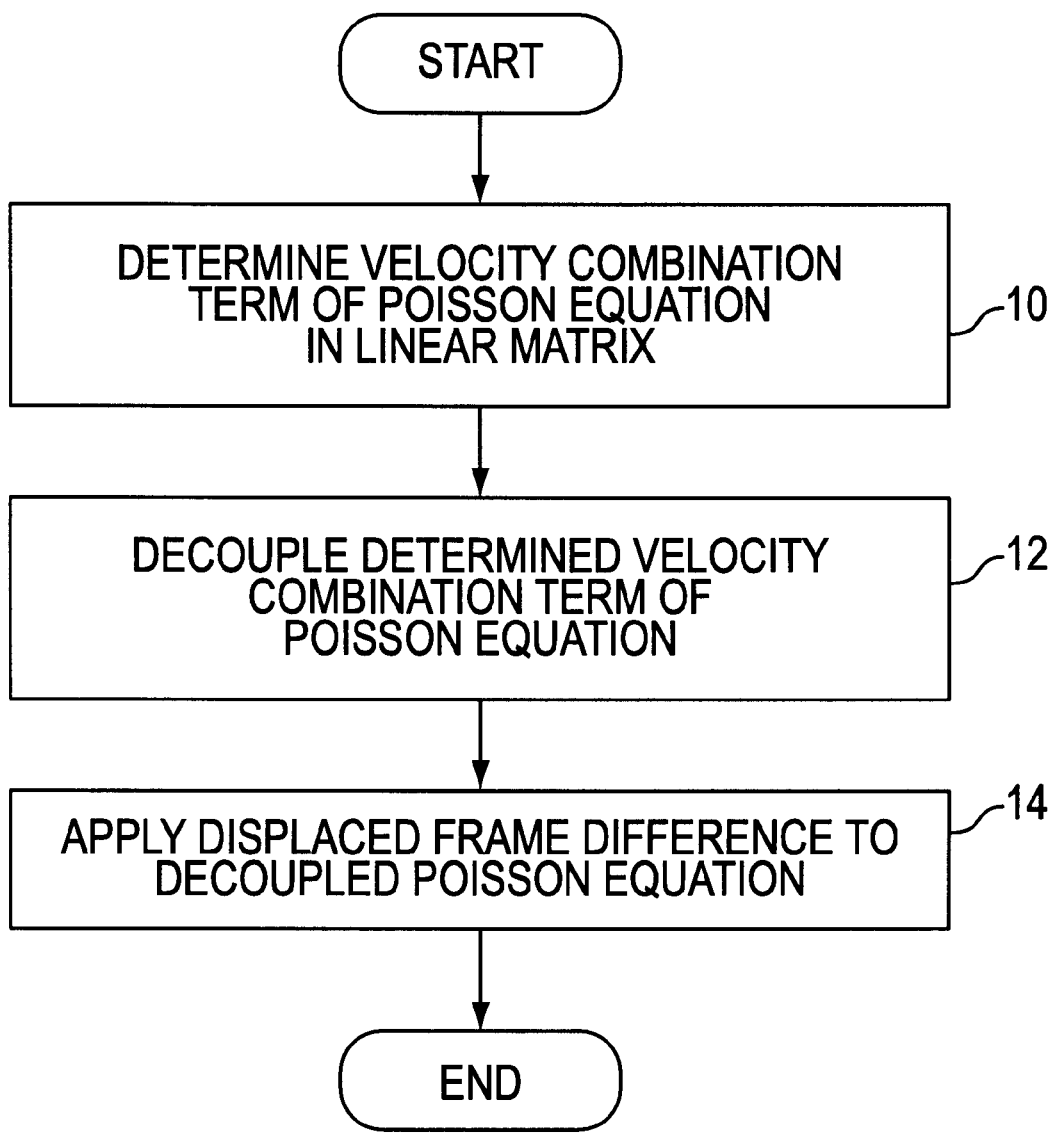
FIG. 1 illustrates a flow chart outlining a local relaxation method for estimating optical flow using Poisson equations according to the present invention.

Referring now to FIG. 1, a velocity combination term of Poisson equation expressed in formula (9) is decoupled in a matrix form (step 10).

By stacking the velocity component as $x=(u,v)^t$, equation (9) can be written in a matrix form as;

$$Gx = Ex + b \qquad (16)$$

where 2×2 matrixes E, G and the input vector "b" are:

$$E = \begin{pmatrix} E & 0 \\ 0 & E \end{pmatrix}, \quad G = \begin{pmatrix} 1+r_x^2 & r_x r_y \\ r_y r_x & 1+r_y^2 \end{pmatrix}, \quad b = \begin{pmatrix} -r_x r_t \\ -r_y r_t \end{pmatrix} \qquad (17)$$

If both spatial gradients are zero, that is, negligible compared to $\alpha^2$, then the function of each component is exactly sinusoidal and the resultant Jacobi relaxation operator will be E (trivially).

The Poisson equation is decoupled using a unitary transform function (step 12). Assuming both spatial gradients are not zero, unitary transform matrix U which can diagonalize the matrix G can be represented as follows;

$$U = \begin{pmatrix} \frac{r_y}{r} & -\frac{r_x}{r} \\ \frac{r_x}{r} & \frac{r_y}{r} \end{pmatrix}, \quad A = UGU^T = \begin{pmatrix} 1 & 0 \\ 0 & 1+r^2 \end{pmatrix} \qquad (18)$$

where $$r = \sqrt{r_x^2 + r_y^2}.$$

And, the vectors "x" and "b" can be transformed as $$Ux = \begin{pmatrix} \frac{r_y}{r}u - \frac{r_x}{r}v \\ \frac{r_x}{r}u + \frac{r_y}{r}v \end{pmatrix} = \begin{pmatrix} x_P \\ x_N \end{pmatrix}, \quad U_b = \begin{pmatrix} 0 \\ -rr_t \end{pmatrix} \qquad (19)$$

In equations (19), each component of the transformed motion vector has physical meaning as the component parallel to the edge direction, $x_P$, and the normal one, $x_N$, respectively.

By applying the unitary transform U, the decoupled Jacobi relaxation equations can be formulated as in equation (20).

$$Ugx = Uex - Ub$$

$$UGU^tUx = UEU^tUx - Ub \qquad (20)$$

$$A = \begin{pmatrix} x_P \\ x_N \end{pmatrix} = UEU^t \begin{pmatrix} x_P \\ x_N \end{pmatrix} - \begin{pmatrix} 0 \\ rr_t \end{pmatrix}$$

Now, if the velocity field is smooth enough to be considered at least approximately as linear in a local region, the complicated shift operator matrix $UEU^t$ can be approximated to be diagonal and its element is just the composite operator E. This is because the coupling effect due to the composite shift operator which is actually an averaging process over the neighboring pixels is less than that due to the direct velocity component. Finally, each component satisfies the following equations;

$$x_P = Ex_P \qquad (21)$$

$$x_N = \frac{1}{1+r^2}Ex_N - \frac{rr_t}{1+r^2}$$

In equations (21), the parallel component of the velocity satisfies a homogeneous difference equation whose Jacobi relaxation operator is E and the Jacobi operator for the normal component is $$\frac{E}{1+r^2}.$$

Therefore SOR with a constant optimum relaxation factor can be applied for the parallel component and LR for the normal component which has spatially varying coefficients.

$$x_P^{n+1} = (1-w_P)x_P^n + w_P E x_P \qquad (22)$$

$$x_N^{n+1} = (1-w_N)x_N^n + \frac{w_N}{1+r^2}(Ex_N - rr_t)$$

where each local relaxation parameter is expressed as follows;

$$w_P = \frac{2}{1+\sqrt{1-\rho_E^2}} \qquad (23)$$

$$w_N = \frac{2}{1+\sqrt{1-\rho_N^2}}, \quad \rho_N = \frac{\rho_E}{1+r^2}$$

Since the norm of the error of the vector $(u,v)^r$ is the same as that of the vector Ux because the vectors can be transformed unitarily from each other, trying to minimize the error of the decoupled vector Ux will make the error of the vector $(u,v)^t$ minimized. So, the iteration using equations (22) can be directly applicable to optical flow estimation. The resultant vectors for every pixel can be transformed by the unitary matrix whenever the horizontal and vertical component, u, v are needed.

However, equations (22) can be further developed because the representation for $(u,v)^t$ is usually required at every iteration in common applications. By vector notation, equations (22) can be rewritten as:

$$\begin{pmatrix} x_P^{n+1} \\ x_N^{n+1} \end{pmatrix} = (I-W)\begin{pmatrix} x_P^n \\ x_N^n \end{pmatrix} - WA^{-1}UEU^t\left[\begin{pmatrix} x_P^n \\ x_N^n \end{pmatrix} + Ub\right] \qquad (24)$$

To re-transform the vector Ux to $(u,v)^t$, $U^t$ is multiplied to both sides of equations (24), and a new LR scheme for the vector field $x=(u,v)^t$ is introduced as;

$$x^{n+1} = (I-UWU^t)x^n + UWU^tG^{-1}E(x^n+b) \qquad (25)$$

where the local relation parameter $UWU^t$ can be approximated by a diagonal matrix as follows;

$$UWU^t = \begin{pmatrix} \dfrac{w_P r_y^2 + w_N r_x^2}{r^2} & \dfrac{r_x r_y (w_N - w_P)}{r^2} \\ \dfrac{r_y r_x (w_N - w_P)}{r^2} & \dfrac{w_P r_x^2 + w_N r_y^2}{r^2} \end{pmatrix} \approx \begin{pmatrix} w_x & 0 \\ 0 & w_y \end{pmatrix} \quad (26)$$

The non-diagonal terms of the local relaxation matrix are relatively very small as compared to the diagonal terms, and they practically do not affect the convergence of the iteration.

Then equation (25) can be rewritten for each velocity component as follows;

$$u^{n+1} = (1 - w_x)u^n + w_x \left\{ \bar{u} - \dfrac{r_x(r_x \bar{u} + r_y \bar{v} + r_t)}{1 + r_x^2 + r_y^2} \right\} \quad (27)$$

$$v^{n+1} = (1 - w_y)v^n + w_y \left\{ \bar{v} - \dfrac{r_y(r_x \bar{u} + r_y \bar{v} + r_t)}{1 + r_x^2 + r_y^2} \right\}$$

where $\bar{u}$ and $\bar{v}$ are the shortened notations for $Eu$ and $Ev$, respectively.

It is interesting to note that the last bracketed term in the proposed iterative equations (27) is exactly the same as that proposed by Horn and Schunck.

The form of the proposed equations (27) can also be derived through a block-wise successive over relaxation. If the stacked vector of the velocity vectors of the whole image is constructed as $(u_1, v_1, u_2, v_2, \ldots u_N, v_N)^t$, then the set of Poisson equations (5) forms a large linear system whose system matrix has as block-diagonal components. With these 2×2 diagonal blocks, the block-wise SOR can be applied, then the same form as equations (27) will result, except for the optimal relaxation parameter.

A displaced frame difference is applied to a coupled Poisson equation (step 14). It is difficult to prove theoretically that the proposed scheme, i.e., equations (27) has better convergence characteristics than the existing scheme, i.e., equations (14). But, both tend to perform the same in terms of steady state error and convergence when the smoothness constant is very large, because the coupling term $r_x r_y$ is so much smaller than $r_x^2$ or $r_y^2$ that its effect can be neglected.

However, if the gradients are measured in the registered image domain, for example, displaced frame differences are used as temporal gradients, then the optimal smoothness constant is inclined to become smaller. Since the smoothness constant is highly related to the ratio between motion constraint error and spatial variation of the implied motion field, the high order derivatives of gradients or the abrupt change of motion field can make the desired value of the constant smaller.

In the next section, displacement frame difference is introduced to the existing and present Lrs to make two more iterative approaches.

A priori knowledge of velocity field can be obtained in various cases. The previously calculated value can be that in any iterative approach, and the velocity of the higher or lower level can be that in hierarchical approach. The velocity estimated using other methods such as moving edge motion or any feature based approaches can also serve as a priori knowledge of the velocity.

In any case, using estimated velocity acquired before applying LR, the brightness conservation can be calculated using the following equation:

$$l(x+x_p+(\delta x-x_p), y+y_p+(\delta y-y_p), t+\delta t) = l(x,y,t) \quad (28)$$

where $(x_p, y_p)$ is a priori estimated displacement.

Approximating the above equation by Tayler's series around the shifted position $(x+x_p, y+y_p)$, the following equation (29) is satisfied;

$$l(x+x_p, y+y_p, t+\delta t) + (\delta x - x_p)l_x' + (\delta y - y_p)l_y' = l(x,y,t) \quad (29)$$

And, from rearranging equation (29), equation (30) can be obtained.

$$\{l(x+x_p, y+y_p, t+\delta t) - l(x,y,t) - x_p l_x' - y_p l_y'\} + \delta X i_x' + \delta Y i_y' = 0 \quad (30)$$

This equation can be regarded as the brightness constraint equation with registered gradients. The first two terms in the brackets of equation (30) form the displacement frame difference, and the terms in the brackets can be thought of as a kind of extrapolated frame difference. The spatial gradients are also measured at the shifted position and can be obtained using the motion compensated average of the subsequent frames.

Using the normalization with the smoothness constant, the brightness constraint with registered gradients can be obtained as follows, $$r_x' u + r_y' v + r_t' = 0 \quad (31)$$

where $r_t' = dfd - r_x' u_p - r_y' v_p$.

Using these gradients, the same procedure as in sections 2 and 3 can be done simply by replacing each gradient with the new one. Therefore, the existing LR equations (14) can be used with the new gradients to estimate the optical flow.

Another iterative scheme can be developed by applying these new gradients to the proposed scheme (22). In this case, however, a more compact form can be derived if the neighborhood average of the previously calculated values is used as a conventional velocity, that is, $(u_p, v_p) = (\bar{u}, \bar{v})$.

$$u^{n+1} = (1 - w_x)u^n + w_x \left\{ \bar{u} - \dfrac{r_x' dfd}{1 + r_x'^2 + r_y'^2} \right\} \quad (32)$$

$$v^{n+1} = (1 - w_y)v^n + w_y \left\{ \bar{v} - \dfrac{r_y' dfd}{1 + r_x'^2 + r_y'^2} \right\}$$

Note that the last bracketed terms of the above equations are the same as those proposed by Nagel and Enkelmann, except that they consider the oriented smoothness constraint.

Now, an embodiment according to the present invention will be described.

The optimal smoothness constant has to be adjusted according to whether the ordinary gradients or the registered gradients are employed. It also varies over images and implied velocity fields. In other words, the error between the true velocity field and the estimated velocity field shows different characteristics in terms of the steady state and convergence which are based on the smoothness constraint.

Figure 2:
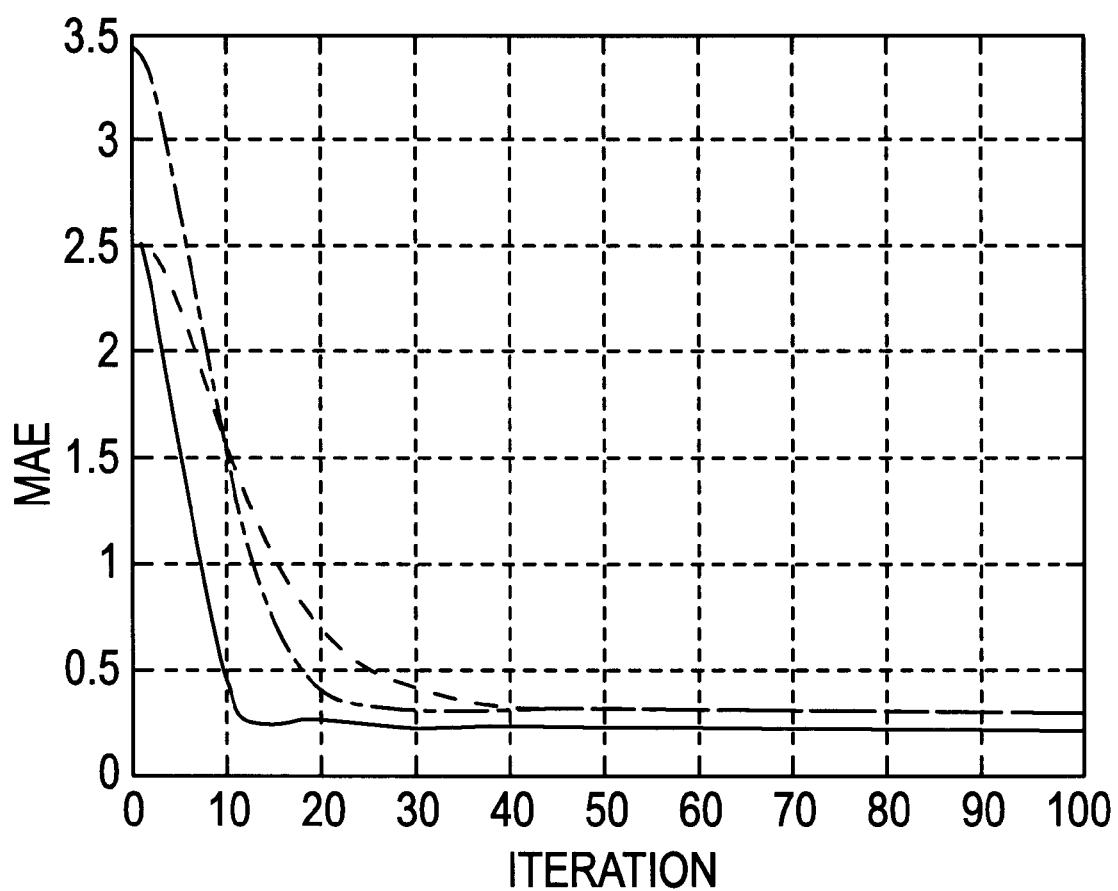
FIG. 2 shows a graph showing iteration characteristics according to the smoothness constraint.

Referring to FIG. 2, to compare different iteration methods with the vagueness due to the smoothness constant, the steady state error generated by various smoothness constant values is analyzed and the constant which gives the minimum steady state error is selected.

Four methods for two kinds of artificial image sequences are compared. First, an artificial image sequence with an artificial motion field is considered. Second, a real texture image is used to make another frame with the artificial motion field.

Figure 3A:
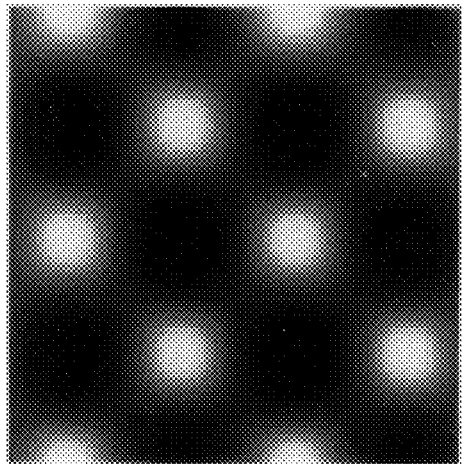
FIG. 3a shows a first artificial image sequence—"Sinewave"

FIG. 3a shows the first artificial image sequence, i.e., "Sinewave". The image has the size of 64×64 pixels and its intensity is calculated by the following equation;

$$I(x, y) = 127 \sin\left(\frac{2\pi x}{32}\right) \cos\left(\frac{2\pi y}{32}\right) \quad (33)$$

Figure 3B:
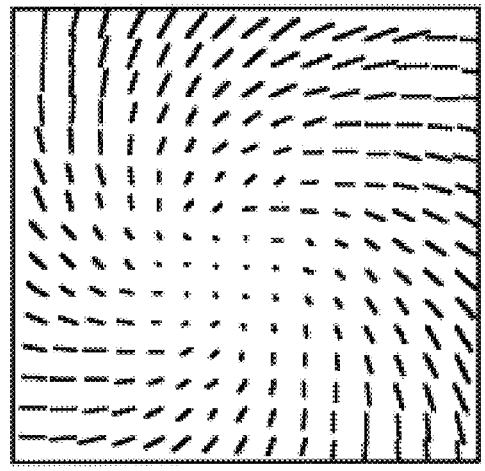

The next frame of "Sinewave" is translated by (1,0) pixels, rotated by 6° and zoomed by 1.1 times. FIG. 3b represents the corresponding motion field.

Figure 4A:
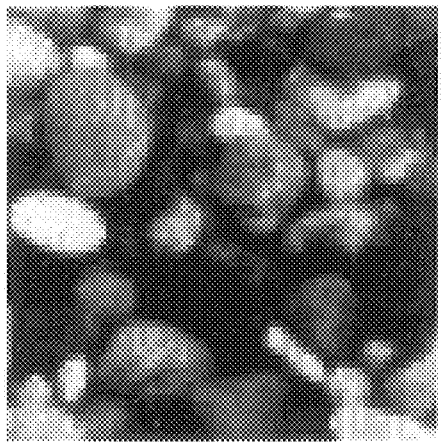
FIG. 4a shows a real texture image—"Pebbles"
Figure 4B:
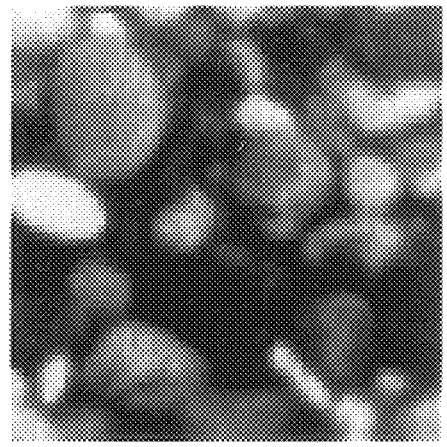
FIG. 4b shows a second frame interpolated from the image "Pebbles" having the motion field shown in FIG. 3b.

FIG. 4a shows a real texture image of "Pebbles" and FIG. 4b shows a second frame which is interpolated into the real texture "Pebbles" having the motion field depicted in FIG. 3b. The real texture image shown in FIG. 4a and the real texture image having the motion field shown in FIG. 3b are tested for a more realistic situation. This sequence is called "Pebbles". The second frame shown in FIG. 4b is a little bit blurred because it is created from the real texture image by interpolation.

The steady state error of the motion field having enough smoothness constants to obtain the relation between the mean absolute steady state error and the smoothness constant is tested. And, it is interpolated by B-spline to find out the minimum position.

Figure 5A:
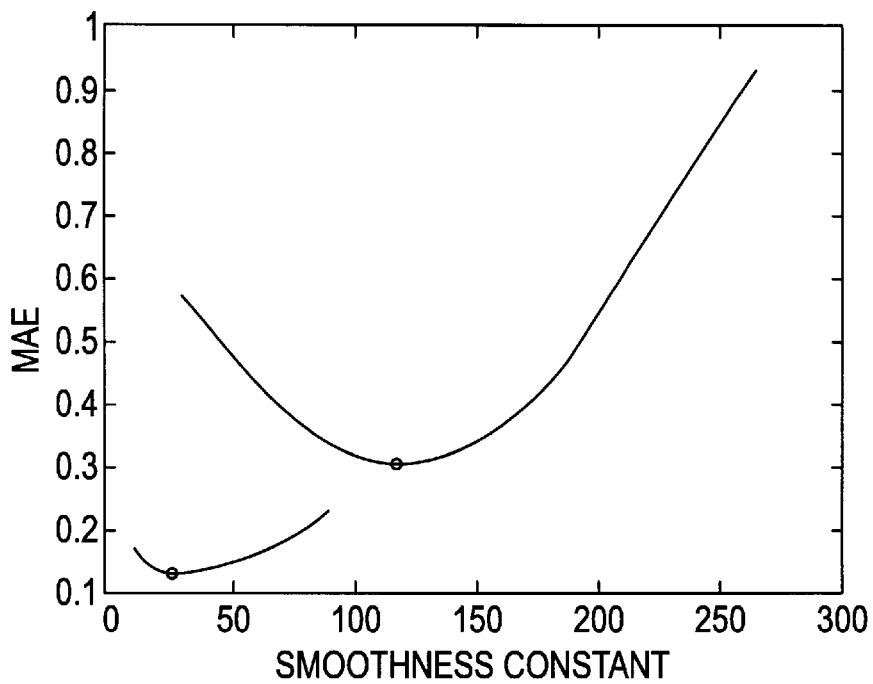
FIG. 5a illustrates the results of the "Sinewave" sequence using an absolute error according to the smoothness constant.
Figure 5B:
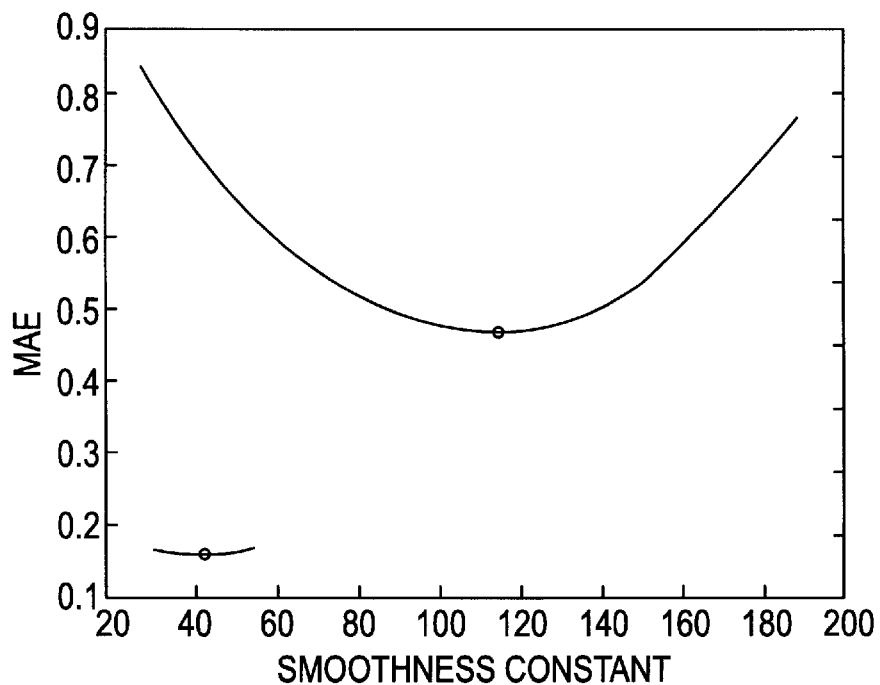
FIG. 5b illustrates the results of the "Pebbles" sequence using an absolute error according to the smoothness constant.

FIGS. 5a and 5b are absolute errors according to the smoothness constant. Referring to FIGS. 5a and 5b, upper curves represent the result obtained using ordinary gradients and the lower curves represent the result using the registered gradients. Also, a point on the curve indicates the minimum position interpolated by B-spline. FIG. 5a shows the result with respect to a "Sinewave" sequence image, and FIG. 5b shows the result with respect to a "Pebble" sequence image. The steady state error proposed in the present invention, i.e., a post-decoupling method is exactly the same as that of the existing algorithm, without a decoupling method. Eventually, the steady state errors for both algorithms are the same and only the convergence characteristics are different. Therefore there are only two curves for each image sequence despite the four methods compared.

Figure 6A:
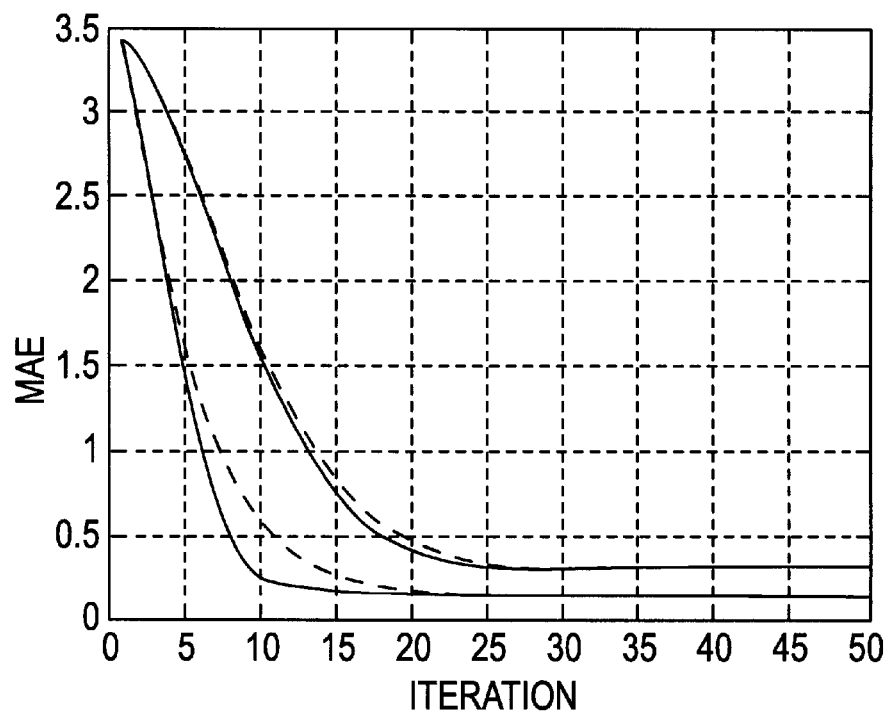
FIG. 6a illustrates the results of a convergence speed for artificial "Sinewave" sequence.
Figure 6B:
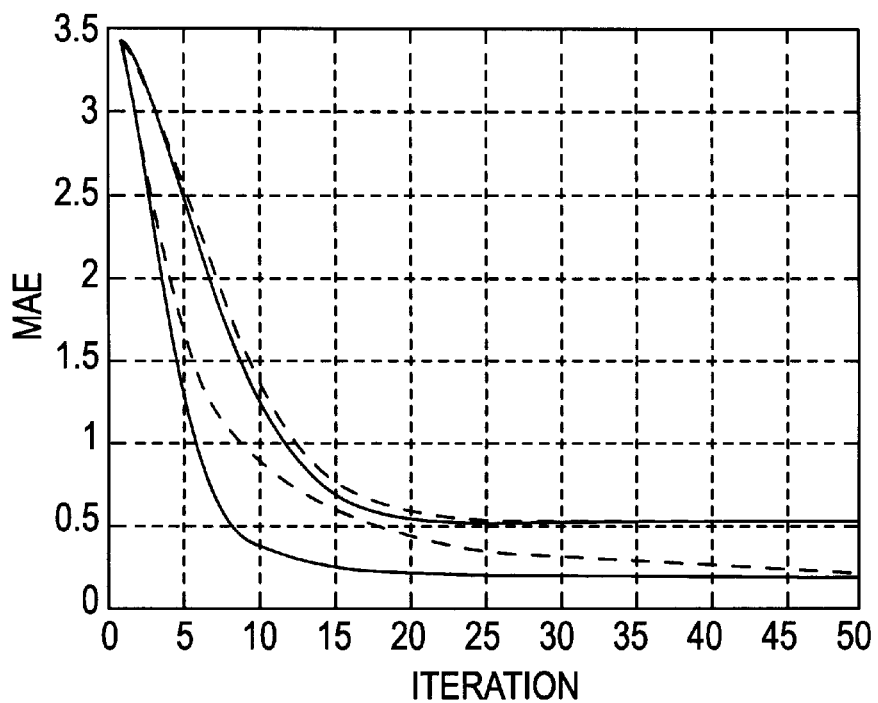
FIG. 6b shows the results of a convergence speed for artificial "Pebbles" sequence.

FIGS. 6a and 6b show the convergence speed for the artificial sequences of each method. Referring to FIGS. 6a and 6b, the upper pair of curves represent the result of using the ordinary gradients and the lower pair of curves represent the result of using the registered gradients. The dashed curves in each pair show the convergence speed of the existing method, that is, a non-coupling method and the solid curves represent the proposed method, post-decoupling method.

Here, it can be understood that while the convergence speed of the post-decoupling method is slightly faster than the non-decoupling method, it is much faster than the existing method having the registered gradients. Note that the steady state error using the registered gradients is much less than that obtained using the ordinary gradients.

There should be a criterion for selecting optimal smoothness constants for real image sequences because the real motion field cannot be identified. The constant which allows some compromise between the motion constraint and the smoothness constraint instead of choosing that having the smallest steady state error should be selected. According to the present invention, the L-curve is used to select the optimal smoothness constant.

First, the relation between the mean absolute error of the displaced frame difference and the deviation from the smooth motion field surface, that is, the magnitude of the gradients of the velocity field is investigated. At this time, they are calculated using various smoothness constants and each smoothness constant is interpolated to obtain a smooth curve. The location where the curve has its maximum curvature is selected and the corresponding smoothness constant is used as the optimal constant.

Figure 7A:
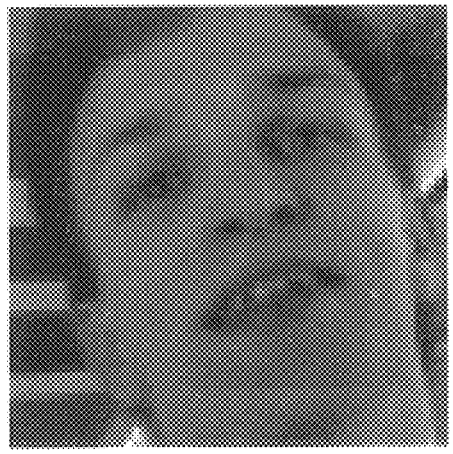
FIG. 7a shows the results of 64×64 parts around a face in the 311th frame of a car sequence.
Figure 7B:
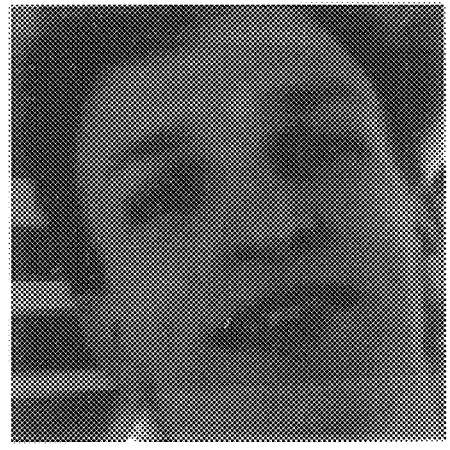
FIG. 7b shows the results of 64×64 parts around a face in the 312th frame of a car sequence.

FIGS. 7a and 7b show the 311th and the 312th frames selected from the well-known car sequence as a real image sequence. This pair of frames is selected because the implied motion between these two frames seems to be very large. FIG. 7a shows the result of the 311th frame, and FIG. 7b shows the result of 312th frame. The facial portions of the selected frames shown in FIGS. 7a and 7b are tested to compare the non-decoupling and the post-decoupling method using registered gradients. The man is bending his head forward between these two frames.

Figure 8A:
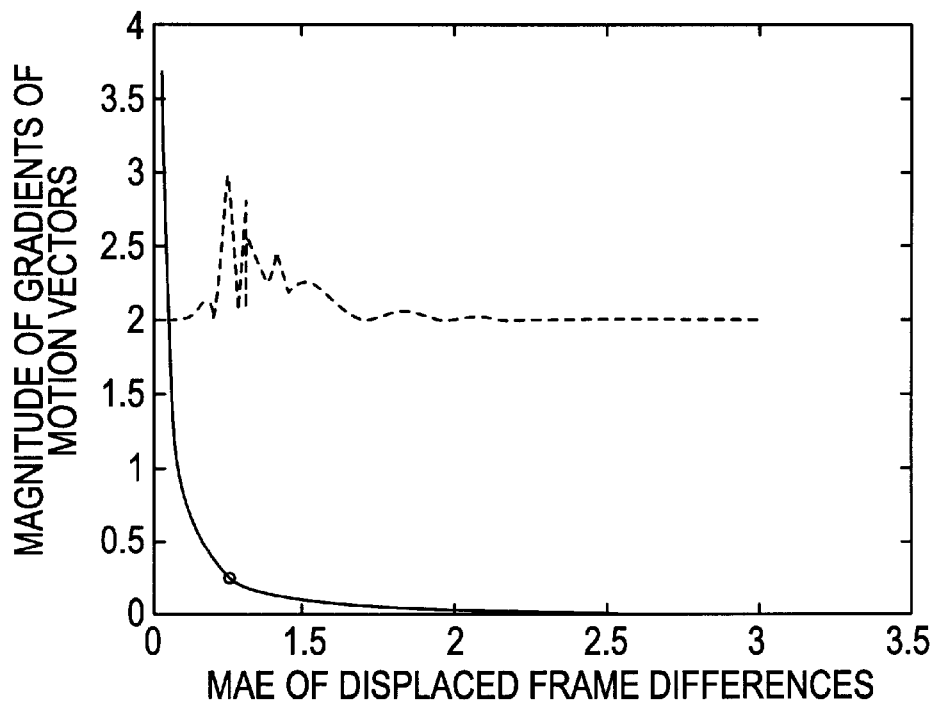
FIG. 8a illustrates a graph showing the relation between MAE of displaced frame differences and the magnitude of gradients of motion vectors, and the relative magnitude of its curvature with respect to the face portion of the car sequence.
Figure 8B:
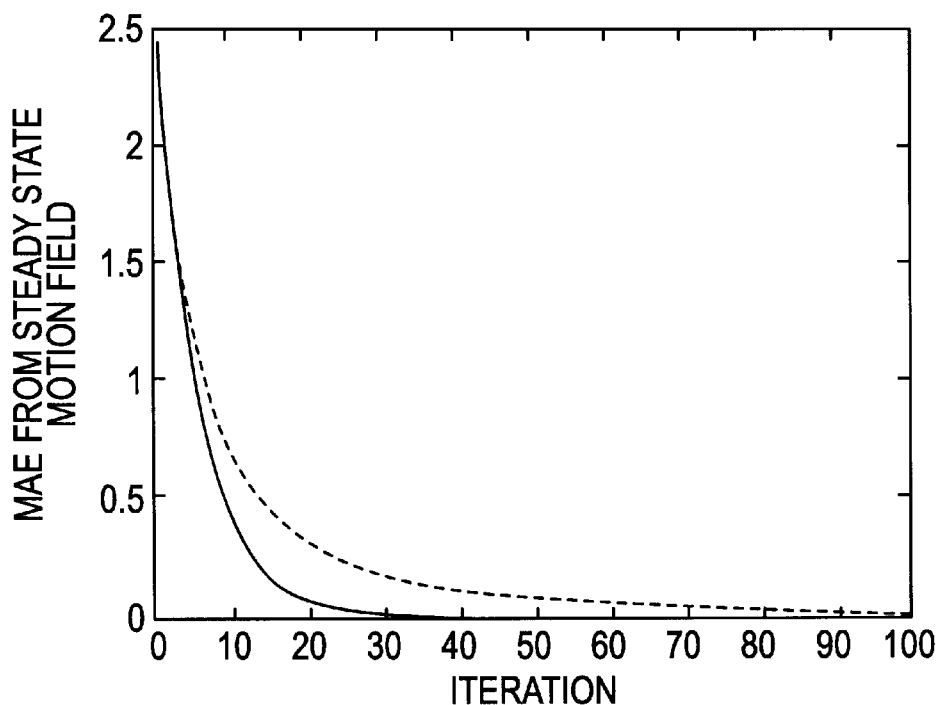
FIG. 8b shows a graph showing the convergence toward a steady state estimated motion field with respect to the face portion of the car sequence.

FIGS. 8a and 8b show the relation between the mean absolute error (MAE) of displaced frame differences and the magnitude of gradients of motion vectors. The solid curve shows that, increasing the smoothness constant makes the motion vector field smoother while it makes the displaced frame differences larger, and vice versa. That is exactly the same as what the L-curve indicates. When the smoothness constants are, however, very small, a large gain in terms of smoothness of the motion field can be obtained by a slight increase in the smoothness constant while the displaced frame differences remain almost unchanged. Meanwhile, with a very large smoothness constant, a slight change of the constant causes a big change in the displaced frame differences while the smoothness of the motion field remains unchanged. Therefore, there is a compromise between the smoothness of the motion field and the displaced frame differences.

The circle marked on the solid curve in FIG. 8a is the compromise point discussed above. This point can be found by calculating the curvature of the curve. The dashed line in FIG. 8 represents the relative magnitude of the curvature. The circle is located on the peak of this curvature.

The convergence speed can be calculated by tracking the difference between the motion field calculated in each step and the steady state motion field. This strategy can be applicable for comparing the two methods because both methods result in almost the same motion field during the steady sate. Actually, their Euclidean distance is less than 0.05 pixel/frame. FIG. 8b shows how fast both methods converge to the steady state motion field. The dashed curve is for the non-decoupling method and the solid curve is for the post-decoupling method. The figure shows that the proposed method is much faster than the existing method. It is more than two times faster for the difference from the steady state to be less than 0.2 pixel/frame.

Figure 9A:
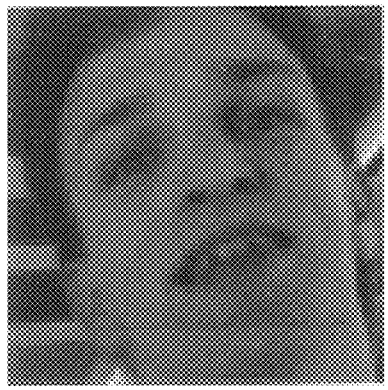
FIG. 9a illustrates frame 311 for verification of the steady state motion field for the face portion.
Figure 9B:
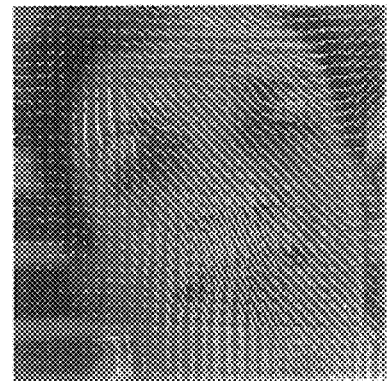
FIG. 9b illustrates a motion field superimposed onto frame 312 for verification of the steady state motion field for the face portion.
Figure 9C:
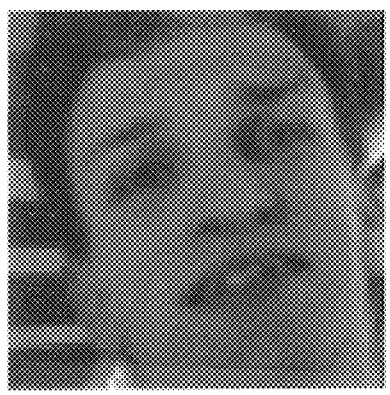
FIG. 9c shows a frame interpolated from frame 311 using the steady state motion field for verification of the steady state motion field for the face portion.
Figure 9D:
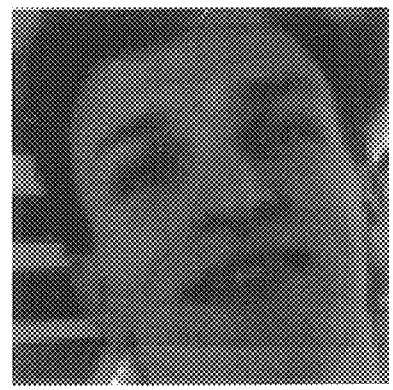
FIG. 9d is frame 312 for verification of the steady state motion field for the face portion.
Figure 9E:
FIG. 9e shows a frame difference between frames 311 and 312.
Figure 9F:
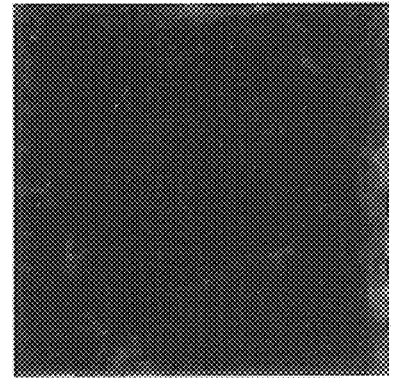
FIG. 9f shows a difference between frame 312 and the interpolated frame.

The steady state motion field having the smoothness constant selected using the method illustrated in FIG. 9a agrees with the results shown in FIG. 8. FIG. 9c is the frame interpolated from the 311th frame of FIG. 9a using the steady state motion field of FIG. 9b wherein the motion vectors are superimposed on the 312th frame shown in FIG. 9d. The interpolated frame and the 312th frame are very similar except the interpolated frame is somewhat brighter than the 312th frame because of the brightness change between the 311th frame and the 312th frame. For more verification, the frame difference between the 311th frame and the 312th frame is depicted in FIG. 9e. And, the differences between the 312th frame and the interpolated frame is shown in FIG. 9f. These two difference pictures are gamma-corrected by a factor of 3 for display purposes.

Figure 10A:
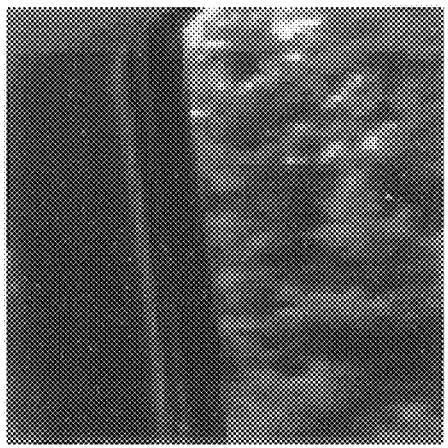
FIG. 10a shows 64×64 parts around the window of the frame 311 of the car sequence.
Figure 10B:
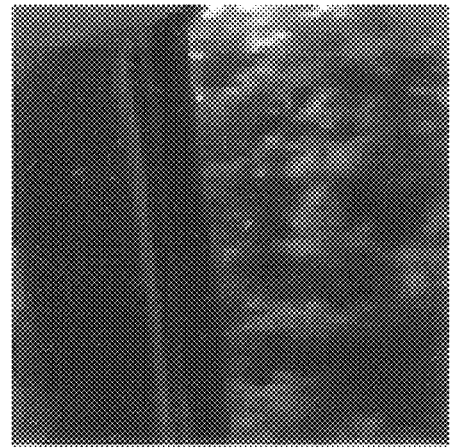
FIG. 10b shows 64×64 parts around the window of the frame 312 of the car sequence.
Figure 11A:
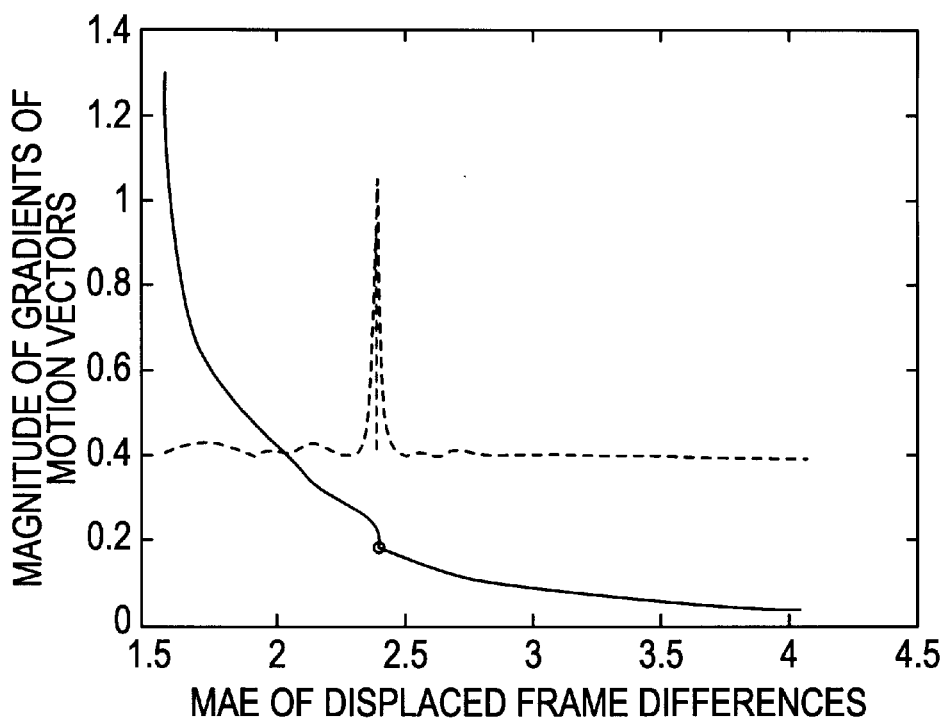
FIG. 11a is a graph showing the relation between MAE of displaced frame differences and the magnitude of gradients of motion vectors, and the relative magnitude of its curvature with respect to a window portion of the car sequence.
Figure 11B:
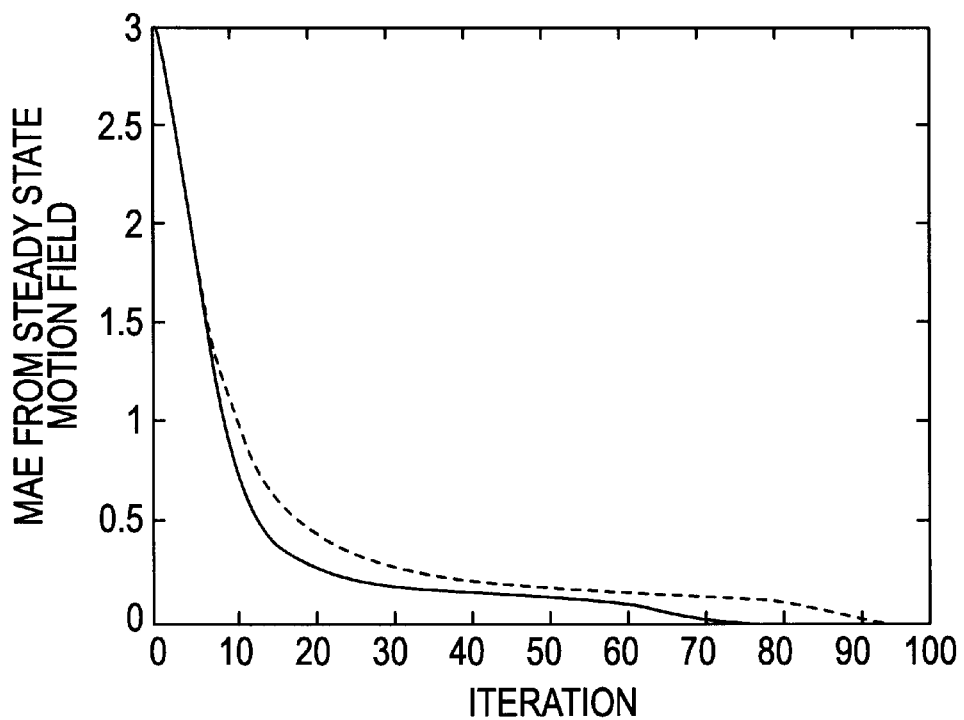
FIG. 11b is a graph showing the convergence toward a steady state estimated motion field with respect to a window portion of the car sequence.
Figure 12A:
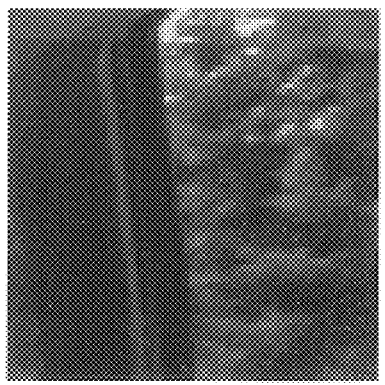
FIG. 12a is frame 311 for verification of the steady state motion field for a window portion.
Figure 12B:
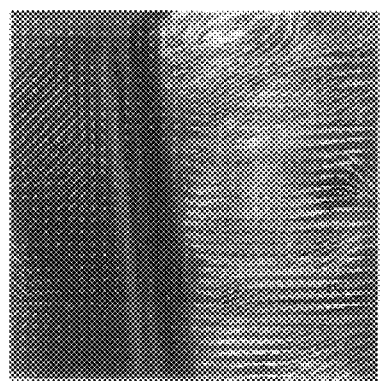
FIG. 12b is a motion field superimposed onto frame 312 for verification of the steady state motion field for a window portion.
Figure 12C:
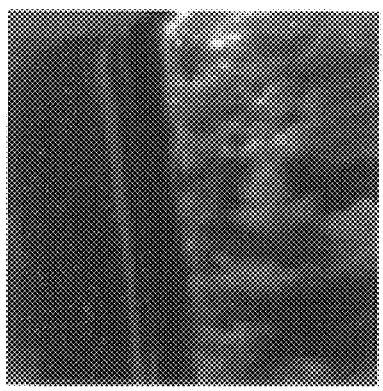
FIG. 12c shows a frame interpolated from frame 311 using the steady state motion field for verification of the steady state motion field for a window portion.
Figure 12D:
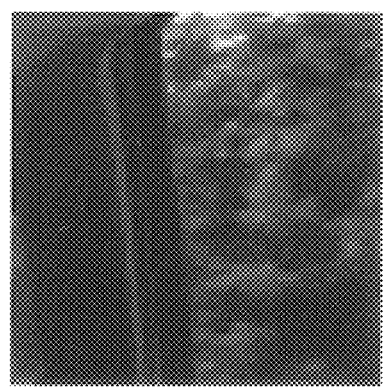
FIG. 12d is the frame 312 for verification of the steady state motion field for a window portion.
Figure 12E:
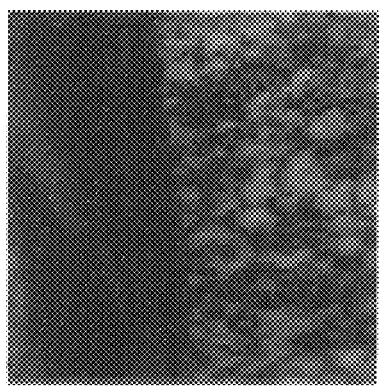
FIG. 12e shows the frame difference between frame 311 and 312.
Figure 12F:
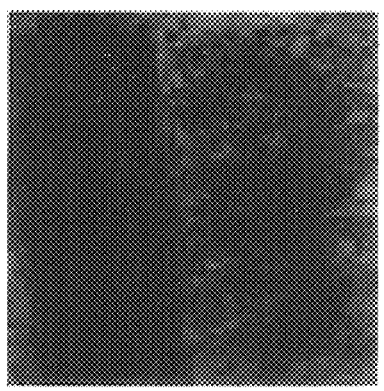
FIG. 12f shows the difference between frame 312 and the interpolated frame.

In order to test the methods for real image sequences having motion boundaries, the window portions of the 311th frame and the 312th frame are tested and shown in FIGS. 10a and 10b. In these portions the objects outside the car are passing-by fast, while the movement of the car frame is relatively small. The same procedure done for the face portion is adapted for the window portion. The relation between the displaced frame differences and the smoothness is represented by the solid line in FIG. 11a, and its curvature is represented by the dashed line. Finally, the smoothness constant is determined to be the peak of the curvature. Here, the circle marks the peak of the curvature as before. While the convergence speed is not much faster as in the case of the face portion image sequence because of the motion boundary, it is still more than 70% faster near the steady state in order for the difference from the steady state motion field to be less than 0.5 pixel/frame as shown in FIG. 11b.

To validate that the chosen smoothness constant works well, the steady state motion field, the interpolated image from the 311th frame using the motion field and the difference images are shown in FIG. 12. The interpolated frame depicts frame 312 very well except in the right-hand side of the image where new images are coming from the right of FIG. 12c. The motion field shown in FIG. 12b also demonstrates the motion boundary clearly. The difference between frame 311 and its interpolated version are shown in FIGS. 12e and 12f, respectively. The difference pictures are gamma-corrected by a factor of 2.

As described above, according to the present invention, a new method was derived by applying LR after decoupling of the Poisson equations. The registered gradients have been introduced to both a non-decoupling method and a post-decoupling method. The post-decoupling method outperforms the non-decoupling method during two artificial image sequences and is twice as fast with registered gradients.

The two methods having registered gradients were compared with real image sequences by choosing the smoothness constant using the L-curve method. The test shows that the post-decoupling method is better than the non-decoupling method in terms of convergence. The general recommendations presented can be applied to any iterative optical flow estimation method. For example, if some iteration is needed in any hierarchical motion estimation, LR can be applied after decoupling the Poisson equation which is general formulation of the optical flow estimation problem. It can also be used to estimate the optical flow inside a small image segment, since SOR and LR are much faster than GS when the image size is not too small, for example, 4×4.

As described above, the convergence speed is faster than that obtained through conventional technology. Also, in the case that a displaced frame difference is applied, a convergence value is accurate and motion in every pixel can be estimated in order to enhance image quality, and in the case of a video code, compression gain can be obtained by using a portion of a motion vector, i.e., the motion vector of a low band signal.

What is claimed is:

1. A local relaxation method for estimating optical flow using a Poisson equation in an apparatus for coding video data, said method comprising the steps of:
   receiving two or more frames of video data;
   estimating optical flow within said frames of video data using a Poisson equation;
   determining said Poisson equation in a linear matrix of Gx=Ex+b according to a change of time;
   decoupling a determined velocity combination term of said Poisson equation; and
   applying a displaced frame difference of a temporal change to said Poisson equation where said velocity combination term is decoupled.

2. A local relaxation method for estimating optical flow according to claim 1, wherein a unitary transform function is used in said step b).

3. An apparatus for coding video data, comprising:
   input means for receiving two or more frames of video data representative of image sequences; and
   an optical flow estimation circuitry, coupled to said input means and being operative to estimate optical flow within said frames of video data using a Poisson equation, said optical flow estimation circuitry comprising: means for determining said Poisson equation in a linear matrix of Gx=Ex+b according to a change of time; means for decoupling a determined velocity combination term of said Poisson equation; and means for applying a displaced frame difference of a temporal change to said Poisson equation where said velocity combination term is decoupled.

4. The apparatus as defined by claim 3, further comprising:
   motion estimating means, coupled to said input means and to an output of said optical flow estimation circuitry, for compensating for motion within said frames of video data.

5. The apparatus as defined by claim 4, wherein said motion estimating means comprises: a subtractor for subtracting a previous frame of video data from a current frame of video data and for outputting a difference therebetween; a spatial coder, coupled to an output of said subtractor, for coding said difference according to a transform coding algorithm to produce a coded error signal; a spatial decoder for decoding said coded error signal; and an adder for adding an output of said spatial decoder to a second previous frame of video data signal, to reconstruct said current frame; a frame memory for storing said reconstructed frame; and means coupled to an output of said frame memory, for producing and outputting said first previous frame to said subtractor.

6. The apparatus as defined by claim 5, wherein said transform algorithm is one of a discrete cosine transform and wavelet transform.

7. A collision alarm system comprising:
   input means for receiving two or more frames of video data representative of image sequences;
   an optical flow estimation circuitry, coupled to said input means and being operative to estimate optical flow within said frames of video data using a Poisson equation, said optical flow estimation circuitry comprising: means for determining said Poisson equation in a linear matrix of Gx=Ex+b according to a change of time; means for decoupling a determined velocity combination term of said Poisson equation; and means for applying a displaced frame difference of a temporal change to said Poisson equation where said velocity combination term is decoupled;
   a structure analysis circuitry, coupled to an output of said optical flow estimation circuitry, for extracting structure of one or more moving objects within said image sequences;
   a motion analysis circuitry, coupled to said output of said optical flow estimation circuitry, for determining relative movement of said objects within said image sequences; and
   inference circuitry, coupled to an output of said structure analysis circuitry and said motion analysis circuitry, for determining if a collision between at least two objects is about to occur and outputting a collision alarm signal accordingly.

* * * * *